United States Patent Office 3,039,920
Patented June 19, 1962

---

3,039,920
N-ORGANOMERCURICYCLOHEXIMIDES
Tomoharu Okuda, Tokyo, Japan, assignor to Tanabe Seiyaku Co., Ltd., Osaka, Japan, a corporation of Japan
No Drawing. Filed Dec. 20, 1960, Ser. No. 76,995
10 Claims. (Cl. 167—33)

This invention relates to novel organomercuric derivatives of cycloheximide. More particularly, it relates to N-organomercuricycloheximides and to a process for preparing the same.

It is known that cycloheximide, 3-[2-(3,5-dimethyl-2-oxocyclohexyl) - 2 - hydroxyethyl]glutarimide, is effective against many of phytopathogenic microorganisms. The compound is produced by culture of Streptomyces griseus and the like on a suitable nutrient medium. It can be isolated from the fermentative beers either by extracting with suitable solvents, or by adsorbing into activated carbons or into ion-exchange resins.

However, it is desirable to enhance the activity of cycloheximide and it is among the objects of the present invention to produce derivatives of cycloheximide whereby the effectiveness thereof against certain microorganisms is substantially improved.

It is also among the objects of the invention to provide a process of reacting cycloheximide with organic mercury compounds to produce organomercuri derivatives having the desired effectiveness.

The invention is based on the discovery that cycloheximide may react with an organomercuric compound to form its N-organomercuric derivative.

The compounds of the invention may be represented by the following structural formula:

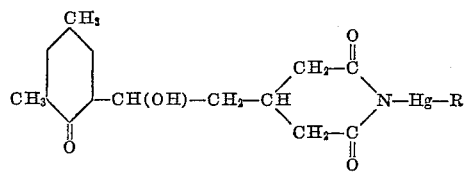

wherein R represents an aryl or 2-methyl-5-thienyl group.

The compounds possess excellent activity against many of the microorganisms controlled by cycloheximide and/or original organomercuric compounds. For example, N-phenylmercuricycloheximide shows higher activity than either phenylmercury acetate or cycloheximide themselves against some of Tricophyton.

The following table shows the above facts:

[Minimum inhibitory concentration (mcg./ml.)]

| Strain<br>Compound | T. aste-roides | T. gra-nula | T. gyp-seum | T. rub-rum | T. inter-digitale |
|---|---|---|---|---|---|
| $C_6H_5Hg$-cycloheximide | 1.25 | 2.5 | 2.5 | 2.5 | 2.5 |
| Cycloheximide | >50 | >50 | >50 | >50 | >50 |
| Phenylmercury acetate | 2.5 | 10 | 10 | 10 | 10 |

Remarks: Test medium: Sabouraud's broth. Inoculum size: ca. 10⁷. Incubation period: 2 weeks at 25° C.

The compounds of the invention are useful as a fungicide for the control of fungous diseases of plants and animals. The foregoing compounds have been found to possess an eradicative activity against rice blast, rice bakanae-disease, barley stripe, barley dwarf bunt, maize smut, potato late blight, potato ring rot, potato common scab, potato black scurf and bean anthracnose when applied to seeds and seedlings at a concentration of about 2 to 20 parts per million, dispersed in a conventional solid or liquid carrier or diluent.

They are also useful as an industrial fungicide, for example, for preventing fungous damage to various kinds of industrial products, such as textiles, furniture, leather, wooden products, rubber goods, coatings, oil and fats, electric wiring, food packages and other packaged commodities.

It was already known that cycloheximide is useful as a rodent repellent. The compounds of the invention also possess the rodent repellency as strong as cycloheximide itself both in their food-acceptance-test and barrier test. Therefore, they are particularly useful for reducing damage by rodents and/or fungi to many industrial products, and agricultural seeds and seedlings.

The compounds of the invention can be prepared by reacting cycloheximide with the desired organomercury salt, such as the acetate in an aqueous solution. Alternatively, corresponding organomercury halide, such as chloride and bromide, may be used in coexistence with sodium acetate. Precipitation of the desired product begins immediately. The precipitate is recovered by filtration, washed with water and then dried. The crude product thus obtained may be, if desired, recrystallized from acetone or an aqueous alcohol into its pure crystalline form. The products occur as colorless crystals and are scarcely soluble in water but soluble in organic solvents, such as acetone, esters and alcohols.

As a starting material, it is not necessary to use cycloheximide in its pure crystalline form. It is possible to employ a crude cycloheximide-containing aqueous solution. Therefore, the invention is also useful for recovery of cycloheximide from its fermentative beers in which a cycloheximide-producing microorganism, such as Streptomyces, griseus, is cultivated. Cycloheximide can be recovered from the organomercuric compounds without any configurational changes by the conventional means.

The following are specific examples of the operation of the invention illustrating, but not limiting the invention.

*Example 1*

5 gm. of cycloheximide dissolved in 15 ml. of ethanol and 250 ml. of water was added to a solution of 6 gm. of phenylmercury acetate in 150 ml. of ethanol and 250 ml. of water with stirring. Precipitation began immediately. After standing in a refrigerator overnight, the precipitate was collected by filtration, washed with water and dried.

Thus, 10.5 gm. of crude N-phenylmercuricycloheximide was obtained. Recrystallization of the product from 50% aqueous methanol gave scaly crystals melting at 161° to 162° C.

*Analysis.*—Calculated for $C_{15}H_{22}O_4N \cdot Hg \cdot C_6H_5 \cdot \frac{1}{2}H_2O$: C, 44.5; H, 4.95; N, 2.48; Hg, 35.4. Found: C, 44.4; H, 5.25; N, 2.55; Hg, 35.44.

*Example 2*

1 gm. of 2-methyl-5-thienylmercury acetate was dissolved in 30 ml. of ethanol and then added to 15 ml. of water. To this was added a solution of 770 mg. of cycloheximide dissolved in 60 ml. of water. Precipitation began immediately. The precipitate was collected by filtration, washed with water and then dried. Thus 1.5 gm. of crude N-(2-methyl - 5 - thienyl)mercuricycloheximide was obtained. When the product was recrystallized repeatedly from 90% methanol, colorless prisms melting at 149° to 150° C. are obtained.

*Analysis.*—Calculated for $C_{15}H_{22}O_4N \cdot Hg \cdot C_5H_5S$: N, 2.43; Hg, 34.8. Found: N, 2.41; Hg, 34.73.

Various other methods for producing the present compounds may be used. Other organomercuri salts may enter into the reaction in place of the acetate. The conditions of the reaction may be altered for convenience.

I claim:
1. An organic mercury compound having the following formula:

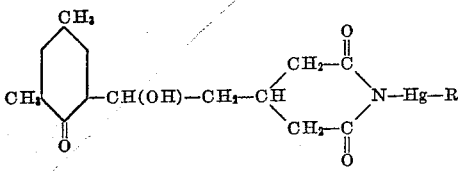

wherein R represents a member selected from the group consisting of phenyl and 2-methyl-5-thienyl group.

2. N-phenylmercuricycloheximide.
3. N-(2-methyl-5-thienyl)mercuricycloheximide.
4. A composition for the control of fungous diseases comprising a carrier having incorporated therein about 2 to 20 parts per million of

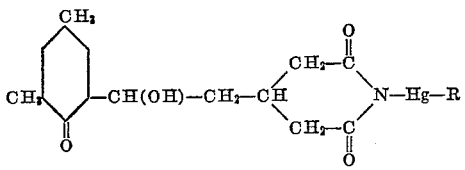

wherein R represents a member selected from the group consisting of aryl and 2-methyl-5-thienyl group.

5. A method which comprises mixing a solution of cycloheximide in aqueous alcohol with phenyl-mercuric salt in aqueous alcohol, whereby N-phenyl-mercuricycloheximide is precipitated.

6. A method according to claim 5 characterized in that a crude solution of cycloheximide is reacted.

7. A method according to claim 6 characterized in that the product is separated from the reaction mixture, and thereafter said product is transformed into cycloheximide.

8. A method according to claim 6 characterized in that the product is separated from the reaction mixture, and thereafter said product is transformed into cycloheximide by hydrolysis.

9. A method according to claim 6 characterized in that the product is separated from the reaction mixture, and thereafter said product is transformed into cycloheximide by hydrolysis in acid solution.

10. A method for the control of fungous diseases which comprises providing a diluent having incorporated therein about 2 to 20 parts per million of

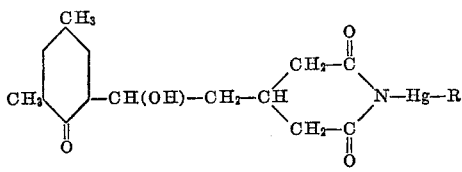

wherein R represents a member selected from the group consisting of phenyl and 2-methyl-5-thienyl group, and applying said composition to substances infested with fungous diseases.

References Cited in the file of this patent
UNITED STATES PATENTS

| | | |
|---|---|---|
| 2,612,502 | Leach | Sept. 30, 1952 |
| 2,697,101 | Kleiman | Dec. 14, 1954 |